(12) United States Patent
Mochizuki et al.

(10) Patent No.: US 8,272,783 B2
(45) Date of Patent: Sep. 25, 2012

(54) MOTION GUIDE DEVICE

(75) Inventors: Hiroaki Mochizuki, Tokyo (JP); Hiroyuki Ishii, Tokyo (JP)

(73) Assignee: THK Co., Ltd., Tokyo (JP)

( * ) Notice: Subject to any disclaimer, the term of this patent is extended or adjusted under 35 U.S.C. 154(b) by 454 days.

(21) Appl. No.: 12/569,620

(22) Filed: Sep. 29, 2009

(65) Prior Publication Data
US 2010/0080496 A1    Apr. 1, 2010

(30) Foreign Application Priority Data

Sep. 30, 2008   (JP) ................................ 2008-255351

(51) Int. Cl.
A47B 88/00    (2006.01)
F16C 29/06    (2006.01)

(52) U.S. Cl. .................. 384/18; 384/45; 312/334.11

(58) Field of Classification Search ............... 384/18, 384/19, 43–45, 49, 50, 55, 57; 312/334.1, 312/334.11, 334.17, 334.38
See application file for complete search history.

(56) References Cited

U.S. PATENT DOCUMENTS

| | | | | |
|---|---|---|---|---|
| 3,897,982 A | * | 8/1975 | Teramachi | 384/45 |
| 4,598,956 A | * | 7/1986 | Teramachi | 384/45 |
| 4,712,927 A | * | 12/1987 | Arrendiell et al. | 384/23 |
| 5,242,227 A | * | 9/1993 | Komiya et al. | 384/45 |
| 5,292,198 A | * | 3/1994 | Rock et al. | 384/21 |
| 5,411,334 A | | 5/1995 | Takei et al. | |
| 5,439,294 A | * | 8/1995 | Rixen et al. | 384/45 |
| 6,402,381 B1 | * | 6/2002 | Shirai et al. | 384/45 |

FOREIGN PATENT DOCUMENTS

| | | |
|---|---|---|
| JP | 58-081215 A | 5/1983 |
| JP | 60-040818 A | 3/1985 |
| JP | 4-42917 U | 4/1992 |
| JP | 6-307445 A | 11/1994 |

OTHER PUBLICATIONS

Notification of Reason for Refusal dated Jul. 31, 2012, issued in corresponding Japanese Patent Application No. 2008-255351, with English translation (5 pages).

* cited by examiner

*Primary Examiner* — James Pilkington
(74) *Attorney, Agent, or Firm* — Westerman, Hattori, Daniels & Adrian, LLP

(57) ABSTRACT

Provided is a motion guide device capable of guiding a moving body smoothly without rattle and facilitating separation of the moving body from a main body. The motion guide device includes: a raceway rail having a rolling-element rolling part; a moving block having a rolling-element circulation path including a loaded rolling-element rolling part facing the rolling-element rolling part of the raceway rail and being mounted on the raceway rail movable relative to the raceway rail; a plurality of rolling elements arranged in the rolling-element circulation path of the moving block; and the raceway rail having a mounting member which does not have the rolling-element rolling part and is configured to be mounted onto a counterpart device, and a raceway rail main body which has the rolling-element rolling part and is configured to be mounted on the mounting member detachably.

6 Claims, 17 Drawing Sheets

Detailed view of VI part

View seen along the arrow IX

Cross sectional view taken along X-X line

Enlarged view of XI part

Enlarged view of XIV part

Enlarged view of XV part

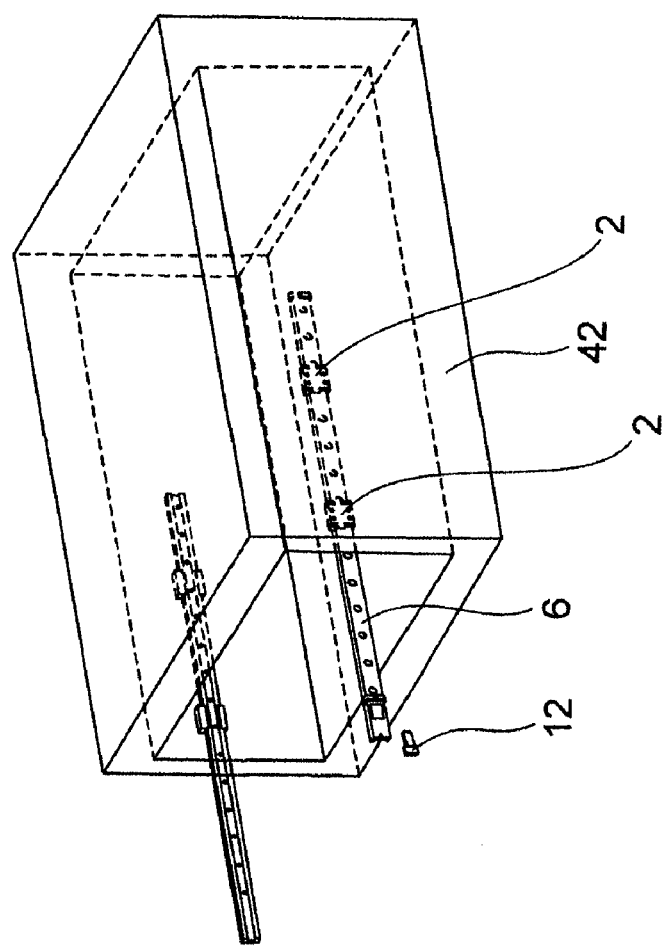
FIG.22
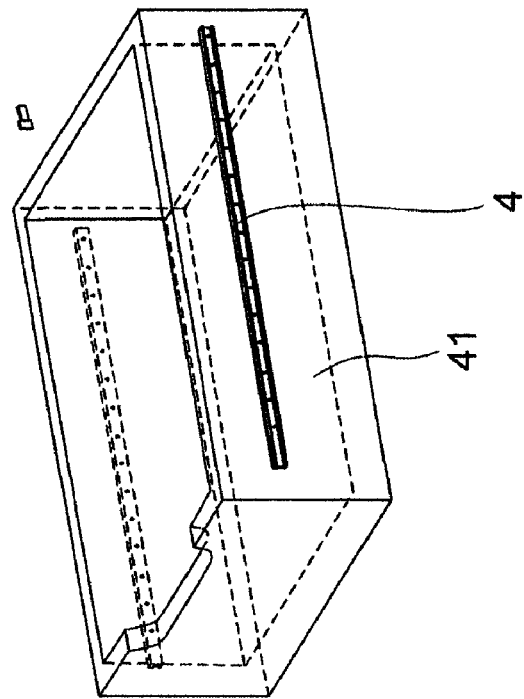

MOTION GUIDE DEVICE

BACKGROUND OF THE INVENTION

1. Field of the Invention

The present invention relates to a motion guide device for guiding linear motion or curvilinear motion of a moving body relative to a main body.

2. Description of the Related Art

One of such motion guide devices is a linear guide having a raceway rail and a saddle-shaped moving block mounted on the raceway rail slidably via a large number of rolling elements.

The raceway rail has a plurality of rolling-element rolling grooves formed therein along the longitudinal direction. The moving block has, formed therein, a plurality of loaded rolling-element rolling grooves facing the rolling-element rolling grooves of the raceway rail and rolling-element return paths extending in parallel with the loaded rolling-element rolling grooves. A pair of end plates is attached to respective end parts of the moving block in the moving direction. In each end plate, a U-shaped direction change path is formed connecting an end of the loaded rolling-element rolling groove and an end of the rolling-element return path. These loaded rolling-element rolling groove, rolling-element return path and direction change path form a circuit-line rolling-element circulation path, in which a plurality of rolling elements is arranged. Motion of the moving block relative to the raceway rail makes the rolling elements roll between the rolling-element rolling groove of the raceway rail and the loaded rolling-element rolling groove of the moving block.

A conventional, typical motion guide device is mounted on an industrial machine such as a machining tool, semiconductor/liquid crystal manufacturing device and guides linear motion or curvilinear motion of a moving body such as a table relative to a main body such as a base. The motion guide device is required to have such high rigidity that it can support a heavy moving body and such high running precision as to position the moving body with high precision. In order to satisfy these demands, the raceway rail, the moving block and rolling elements are made of steel product with high rigidity. And, the raceway rail and the moving block are fixed on the moving body and moving body with a bolt For example, see Japanese Patent Application Laid-open No. 6-307445).

However, in these days, motion guide devices are used for various purposes, and often mounted in not only industrial machines, but also, automobiles, aircrafts, and home appliances. When a motion guide device is mounted in a home appliance, requirements for the motion guide device are, rather than high rigidity, high running precision, separatability of the moving body from the main body so that the motion guide device can be cleaned by removing the moving body from the main body, and light weight of the motion guide device itself. Needless to say, if it is mounted in a home appliance, intrinsic property of the motion guide device enabling smooth guiding of the moving body without rattle.

However, when the conventional, typical motion guide device is used and the raceway rail and the moving block are fixed directly on the bolts, the moving body can be guided smoothly without rattle however, when the stroke of the moving block is restricted, in order to separate the moving body from the main body, the bolt needs to be taken away and the moving body is separated from the moving body or bolt needs to be taken away to separate the raceway rail from the main body. That is, separation of the moving body from the main body become becomes difficult. Even if, like the motion guide device disclosed in Japanese Patent Application Laid-open No. 6-307445, the raceway rail having rolling-element rolling groove formed therein is split and split raceway rails are connected to the raceway rail main body, the moving body is still difficult to be separated from the main body.

The present invention has an object to provide a motion guide device capable of guiding a moving body smoothly without rattle and facilitating separation of the moving body from the main body.

BRIEF SUMMARY OF THE INVENTION

In order to solve the above-mentioned problems, the invention according to first aspect of the present invention is a motion guide device comprising: a raceway rail having a rolling-element rolling part; a moving block having a rolling-element circulation path including a loaded rolling-element rolling part facing the rolling-element rolling part of the raceway rail and being mounted on the raceway rail movable relative to the raceway rail; a plurality of rolling elements arranged in the rolling-element circulation path of the moving block; and the raceway rail having a mounting member which does not have the rolling-element rolling part and is configured to be mounted onto a counterpart device, and a raceway rail main body which has the rolling-element rolling part and is configured to be mounted on the mounting member detachably.

A second aspect of the present invention is a motion guide device comprising: a raceway rail having a rolling-element rolling part; a moving block having a rolling-element circulation path including a loaded rolling-element rolling part facing the rolling-element rolling part of the raceway rail and being mounted on the raceway rail movable relative to the raceway rail; a plurality of rolling elements arranged in the rolling-element circulation path of the moving block; and the moving block having a mounting member which does not have the rolling-element circulation path and is configured to be mounted onto a counterpart device, and a raceway rail main body which has the rolling-element circulation path and is configured to be mounted on the mounting member detachably.

According to the present invention, the mounting member is first mounted on another device and then the raceway rail main body with the moving block mounted thereon can be detached from the mounting member. With this structure, the moving body can be easily detached from the main body. Besides, as the motion guide device of the present invention adopts the same rolling-element circulation structure as that of the conventional motion guide device, the moving body can be guided smoothly without rattle and stroke of the moving body can be longer.

BRIEF DESCRIPTION OF THE SEVERAL VIEWS OF THE DRAWINGS

The above and other objects and features of the invention will appear more fully hereinafter from a consideration of the following description taken in connection with the accompanying drawing wherein one example is illustrated by way of example, in which;

FIG. 22 is a perspective view illustrating the drawer detached from a case; and

DETAILED DESCRIPTION OF THE INVENTION

Figure 1:
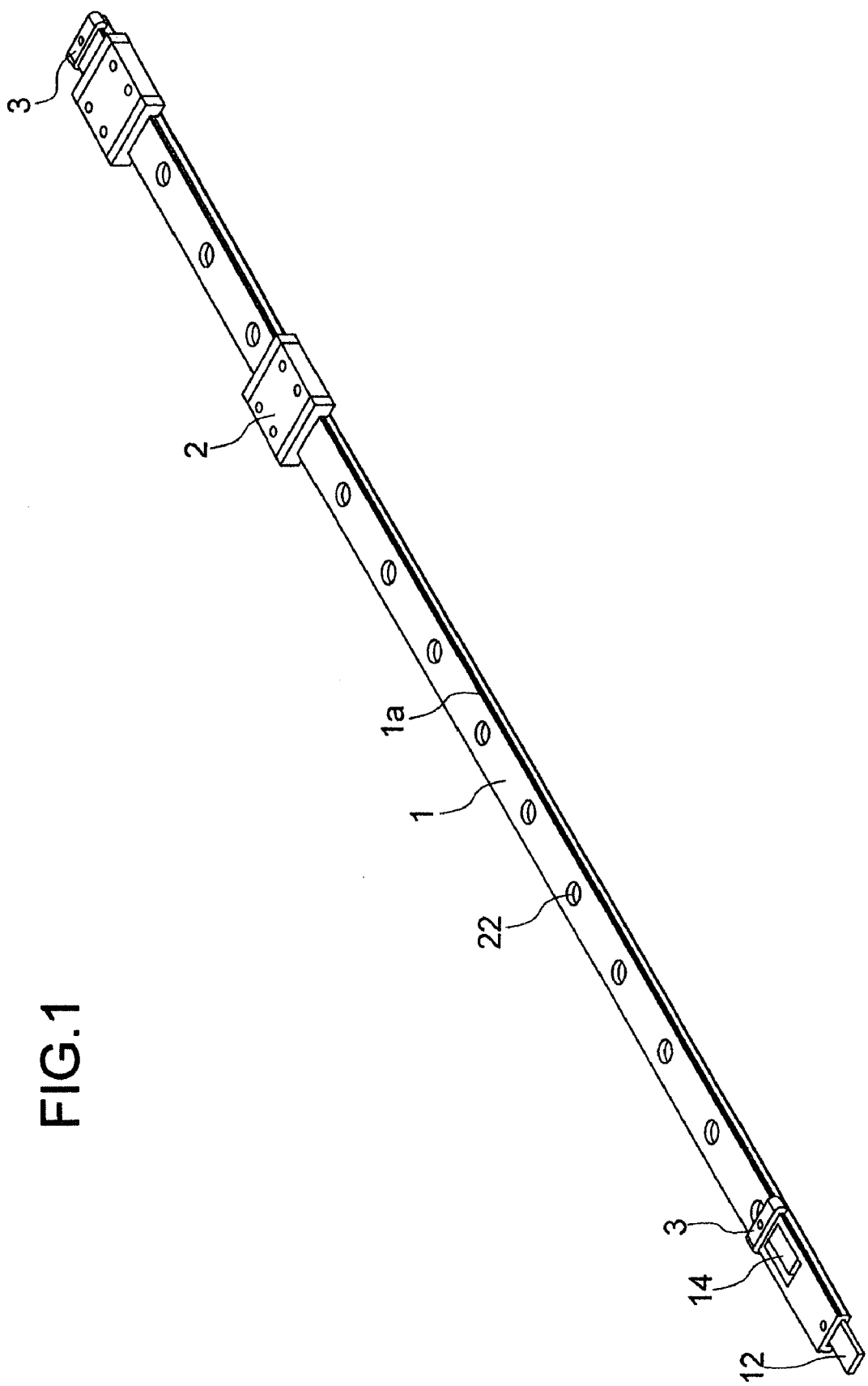
FIG. 1 is a perspective view of a motion guide device according to a first exemplary embodiment of the present invention.

With reference to the attached drawings, exemplary embodiments of the present invention will be described in detail below. FIG. 1 is a perspective view of a motion guide device according to a first exemplary embodiment of the present invention. A raceway rail 1 elongates straightly. A saddle-shaped moving block 2 is mounted on the raceway rail 1. Linear motion of the moving block to the raceway rail is relative motion and the raceway rail may move linearly relative to the moving block. Any one of the raceway rail 1 and the moving block 2 is mounted on a moving body.

Figure 2A:
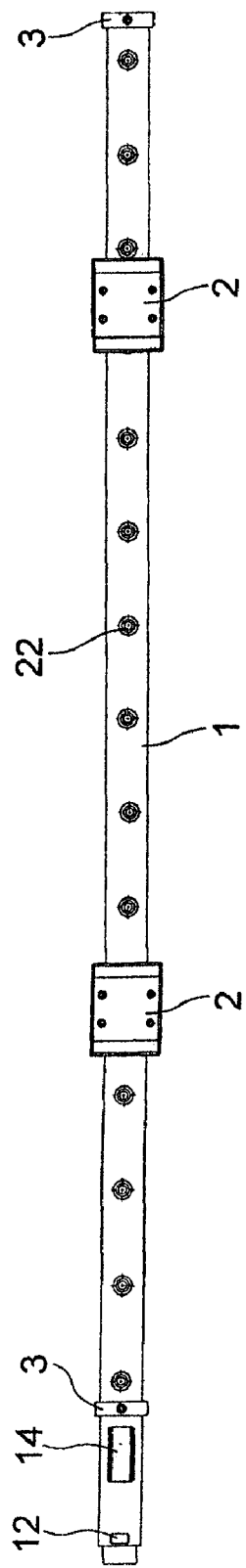
FIGS. 2A and 2B are detailed views of the motion guide device, FIG. 2A being a plan view thereof and FIG. 2B being a side view thereof.
Figure 2B:
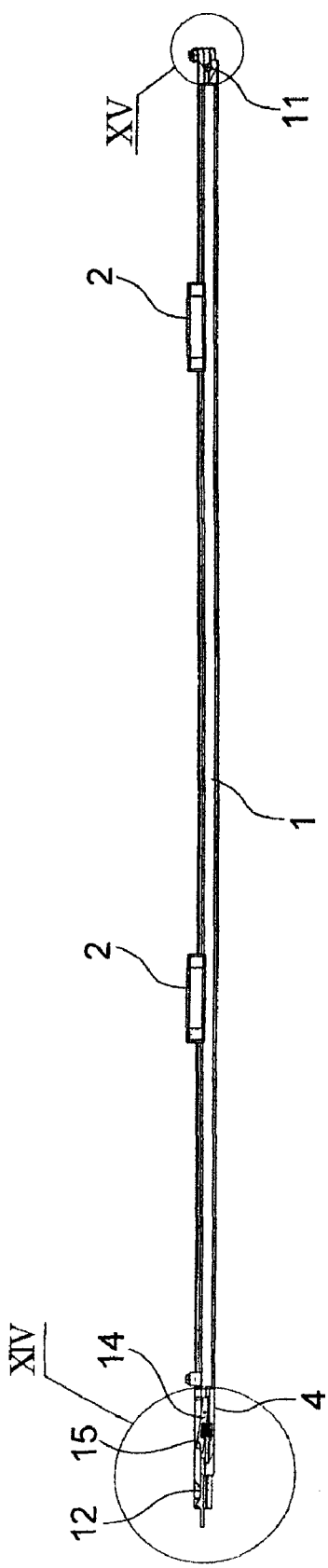

FIG. 2A is a plan view of the motion guide device and the FIG. 2B is a side view of the motion guide device. On the raceway rail 1, two moving blocks 2 are mounted. A stopper 3 is attached to each end of the raceway rail 1 in the longitudinal direction for restricting stroke of the moving blocks 2.

Figure 3:
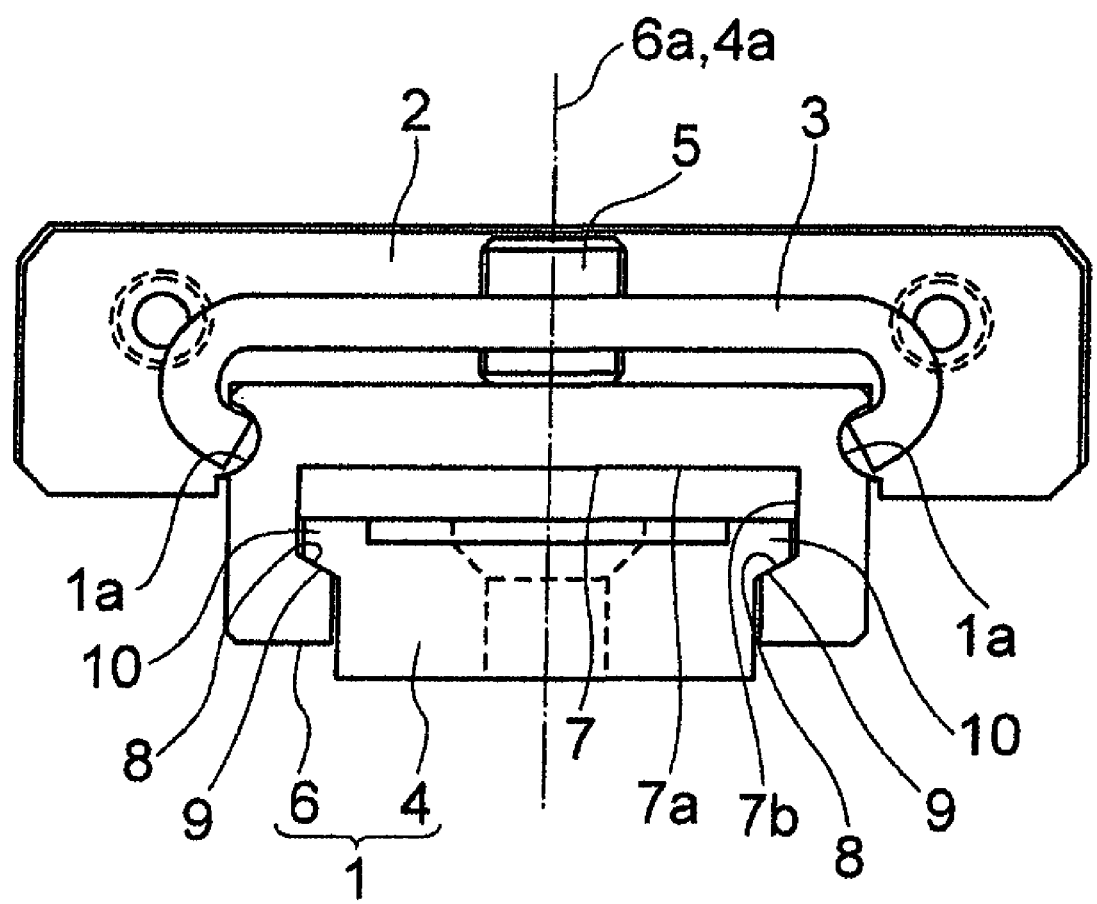
FIG. 3 is a front view of the motion guide device.

As illustrated in the front view of the motion guide device of FIG. 3, the stopper 3 is an elongated steel that extends in the width direction of the raceway rail 1 and bent into C shape. At both ends of the bent stopper 3, the stopper 3 is caught in ball rolling grooves 1a of the raceway rail 1. In order to solidify connection of the stopper 3 and the raceway rail 1, a stopper screw 5 is used to fasten the stopper 3.

The raceway rail 1 has a mounting piece 4 as a mounting member mounted on a moving body or a main body of another device and a raceway rail main body 6 mounted on the mounting piece 4 detachably. In the raceway rail main body 6, a mounting piece insertion groove 7 is formed extending in the longitudinal direction. This mounting piece insertion groove 7 is symmetric with respect to a center line 6a of the raceway rail main body 6 and has a bottom wall 7a perpendicular to the center line 6a of the raceway rail main body 6 and a pair of side walls 7b in parallel with the center line 6a of the raceway rail main body 6. In each of the side walls 7b, an inclined surface 8 is formed inclined downward so that the width between the opposed side walls 7b at the upper side is longer than that at the lower side. The mounting piece 4 is also symmetric with respect to its center line 4a. In each side surface of the mounting piece 4, an inclined surface 9 is formed conforming to the inclined surface of the mounting piece insertion groove 7. With this inclined surfaces 9, an enlarged part 10 is formed broadened horizontally at the upper side of the mounting piece 4.

In the mounting piece insertion groove 7, the mounting piece 4 is inserted slidably in the longitudinal direction of the raceway rail main body 6. The inclined surface 9 of the enlarged part 10 of the mounting piece 4 abuts to the inclined surface 8 of the mounting piece insertion groove 7 and thereby the mounting piece 4 is prevented from coming out of the mounting piece insertion groove 7 in the direction perpendicular to the longitudinal direction (downward in FIG. 3).

Here, in order to slide the mounting piece 4 relative to the mounting piece insertion groove 7, a gap is provided in a cross section perpendicular to the longitudinal direction, between the raceway rail main body 6 and the mounting piece 4. This gap may cause rattle between the raceway rail main body 6 and the mounting piece 4. In order to prevent this rattle, rattle preventing means 11, 12 is provided to fill in the gap between them. The structure of the rattle preventing means 11, 12 is described later.

As illustrated in FIG. 2B, the mounting piece insertion groove 7 of the raceway rail main body 6 extends throughout almost entire length in the longitudinal direction of the raceway rail main body 6. The mounting piece 4 also extends throughout almost entire length in the longitudinal direction of the mounting piece insertion groove 7. The rattle preventing means 11 and 12 is provided at each end of the raceway rail main body 6 in the longitudinal direction to prevent rattle occurring at the corresponding end of the raceway rail main body 6 in the longitudinal direction. As the mounting piece is elongated almost the entire length of the mounting piece insertion groove 7 in the longitudinal direction, it becomes possible to easily prevent rattle from occurring between them. As the rattle preventing means is provided at each end of the raceway rail main body 6 in the longitudinal direction, it becomes possible to effectively prevent rattle from occurring in the raceway rail main body 6.

As illustrated in FIG. 2B, the mounting piece 4 is provided with drop prevention means 14 for preventing the mounting piece 4 from dropping out of the mounting piece insertion groove 7. In the raceway rail main body 6, an opening is formed to expose the mounting piece 4 inserted in the mounting piece insertion groove 7. The drop prevention means 14 is engaged in the opening 15 to prevent the mounting piece 4 from coming out of the mounting piece insertion groove 7. The structure of the drop prevention means is described later.

Figure 4A:
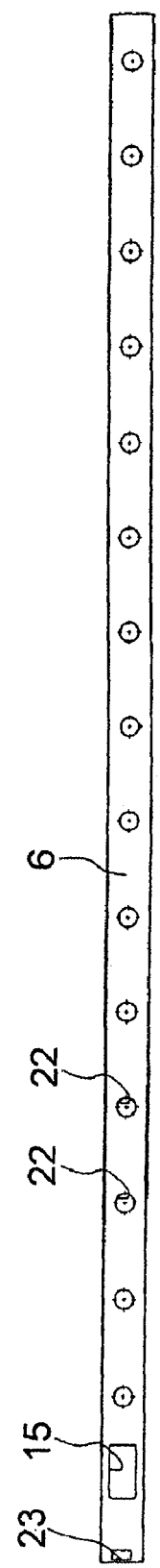
FIGS. 4A and 4B are detailed views of a raceway rail main body, FIG. 4A being a plan view thereof and FIG. 4B being a side view thereof.
Figure 4B:
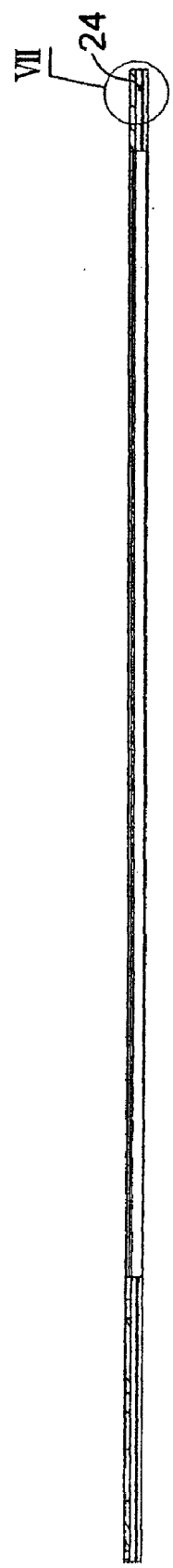
Figure 5:
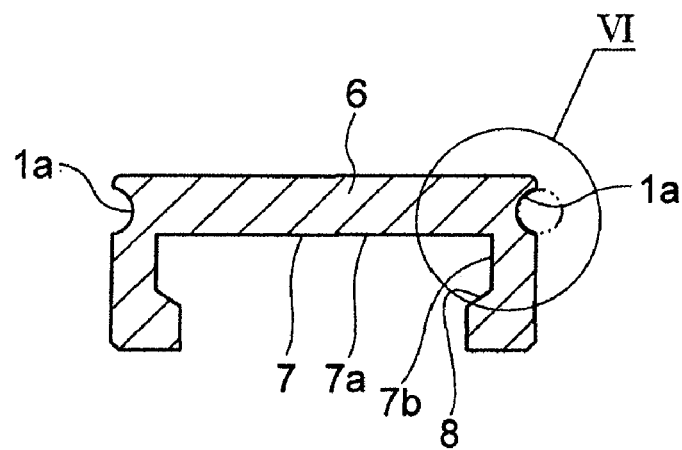
FIG. 5 is a cross-sectional view of the raceway rail main body.

FIGS. 4A, 4B and 5 illustrate the raceway rail main body 6. FIG. 4A is a plan view of the raceway rail main body 6, and FIG. 4B is a side view thereof (including a partial cross-sectional view). FIG. 5 is a cross-sectional view perpendicular to the longitudinal direction. As illustrated in FIG. 5, the raceway rail main body 6 has a recess at the bottom, where the mounting piece insertion groove 7 is formed. As described above, the mounting piece insertion hole 7 has the bottom wall 7a and the pair of side walls 7b, and each of the side walls 7b has the inclined surface 8. In each side surface of the raceway rail main body 6, one-thread ball rolling groove 1a is formed as a rolling-element rolling part extending in the longitudinal direction of the raceway rail main body 6. The ball rolling groove 1a is a Gothic arch groove composed of combined two circular arcs.

Figure 6:
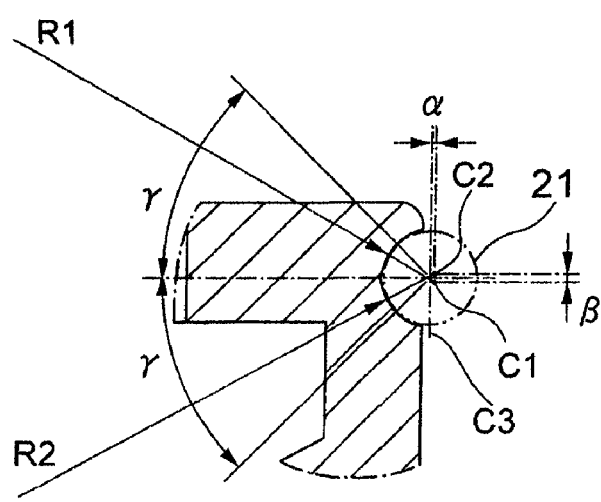
FIG. 6 is a detailed view of the VI part of FIG. 5.

FIG. 6 is a detailed view of the Gothic arch groove. Two circular arcs R1 and R2 of the Gothic arch groove have curvature radii slightly larger than the radius of the ball 21. The centers C1 and C2 of the two circular arcs R1 and R2, respectively, are positioned away from the center line C3 of the ball 21 (to the right side in FIG. 6). The centers C1 and C2 of the two circular arcs R1 and R2, respectively, are vertically away from each other by a distance β. A line connecting a contact point of the ball 21 with the circular arc R1 or R2 and the center of the ball 21 is set to have a contact angle γ of 45 degrees relative to the horizontal line.

This raceway rail main body 6 is manufactured by aluminum extrusion. In concurrence with extrusion, the ball rolling grooves 1a are formed. In order to solve the galvanic corrosion, the surfaces of the raceway rail main body 6 are subjected to alumite treatment. The raceway rail main body 6 may be formed of light alloy such as duralumin, instead of aluminum.

As illustrated in FIG. 4A, in the upper surface of the raceway rail main body 6, a plurality of access holes 22 are formed at a fixed pitch in the longitudinal direction. The pitch of the access holes 22 is equal to a pitch of holes 36 of the mounting piece 4 descried later (see FIG. 8A). As the access holes 22 are formed in the raceway rail main body 6, the raceway rail main body 6 can achieve weight reduction. Besides, the mounting piece 4 can be mounted on another device without detaching the moving block 2 from the raceway rail main body 6. In the raceway rail main body 6, the opening 15 is formed in engagement with the drop prevention means 14. Besides, an engagement opening 23 is formed in engagement with the rattle preventing means 12.

Figure 7:
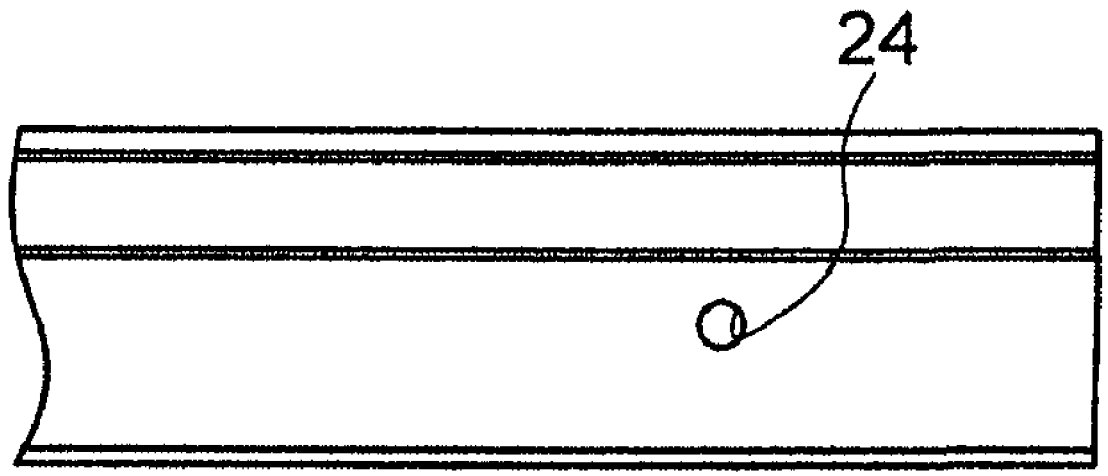
FIG. 7 is an enlarged view of the VII part of FIG. 4B.

As illustrated in FIGS. 4A and 7, in an end part of the raceway rail main body in the longitudinal direction, a pin insertion hole 24 is formed. The pin insertion hole 24 is formed in each side wall of the raceway rail main body 6. In the pin insertion hole 24, a pin 25 is inserted extending in the horizontal direction. The pin 25 is 11 made of rubber as an elastic member consisting in the rattle preventing means. The elastic stopper 11 takes a shape of cylindrical column.

Figure 8A:
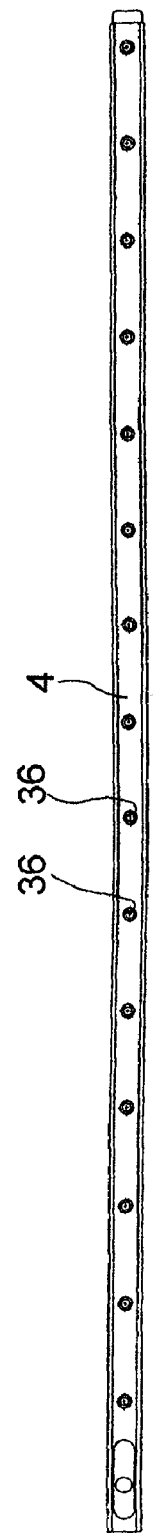
FIGS. 8A and 8B are detailed views of a mounting piece, FIG. 8A being a plan view thereof and FIG. 8B being a side view thereof;]
Figure 8B:
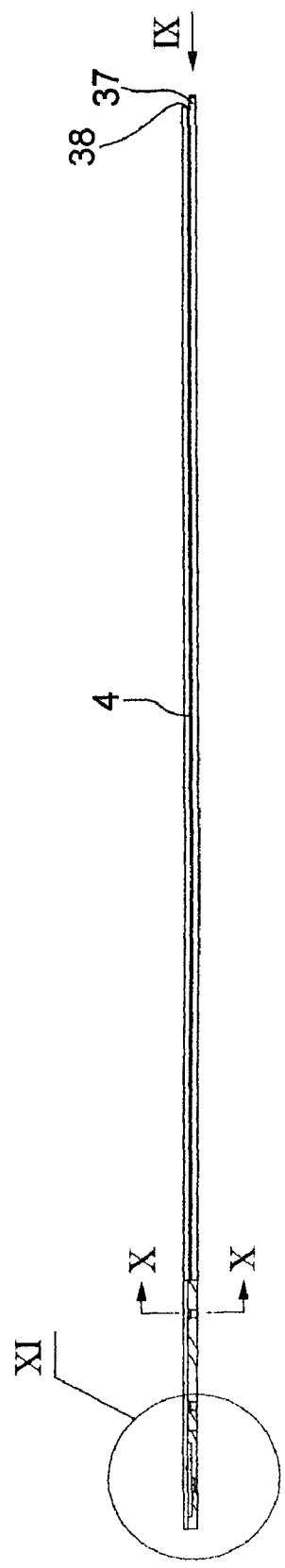
Figure 9:
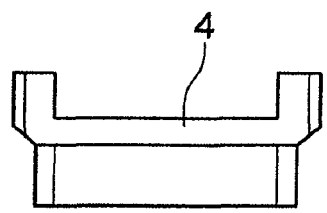
FIG. 9 is a view seen along the arrow IX of FIG. 8B.

FIGS. 8A, 8B and 9 illustrate the mounting piece 4. FIG. 8A is a plan view of the mounting piece 4 and FIG. 8B is a side view thereof (including a partial cross-sectional view). FIG. 9 is a front view of the tip end side of the mounting piece 4. The entire length of the elongated mounting piece 4 is almost the same as that of the raceway rail main body 6. However, different from the raceway rail main body 6, the rolling-element rolling part is not formed in the mounting piece 4.

Figure 10:
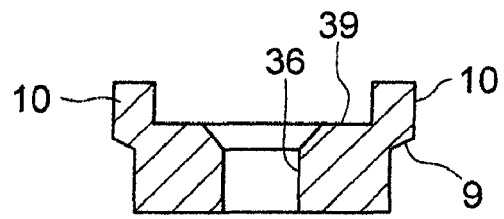
FIG. 10 is a cross sectional view taken along the line X-X of FIG. 8B.

As illustrated in the cross-sectional view of FIG. 10, in each side surface of the mounting piece 4, the inclined surface 9 is formed which conforms to the inclined surface 8 of the mounting piece insertion groove 7. With this inclined surfaces 9, the enlarged part 10 is formed broadened horizontally at the upper side of the mounting piece 4. In the upper surface of the mounting piece 4, a depression groove 39 is formed in the longitudinal direction. The mounting piece 4 is also manufactured by aluminum extrusion like the raceway rail main body 6. In order to prevent galvanic corrosion, the surfaces of the mounting piece 4 are subjected to alumite treatment.

As illustrated in FIG. 8A, in the depression groove 39 in the upper surface of the mounting piece 4, there is a plurality of holes 36 formed at a fixed pitch in the longitudinal direction. As illustrated in the cross-sectional view of FIG. 10, each hole 36 takes a shape conforming to a shape of a screw or bolt. The screw or bolt is inserted into the hole 36 to fasten the counterpart device with the screw or bolt so that the mounting piece 4 is fixed to the counterpart device.

As illustrated in FIG. 8B, there is a step difference at the insertion-side end of the mounting piece 4. In other words, at the insertion-side end of the mounting piece 4, a stopper abutting part 37 is formed to have a lower height. When the mounting piece 4 is inserted into the mounting piece insertion groove 7, this stopper abutting part 37 is fit under the elastic stopper 11. At the end of the mounting piece 4, an abutting surface 38 is formed perpendicular to the top surface of the stopper abutting part 37. Once this abutting surface 38 abuts to the elastic stopper 11, the mounting piece 4 is positioned in the longitudinal direction.

Figure 11:
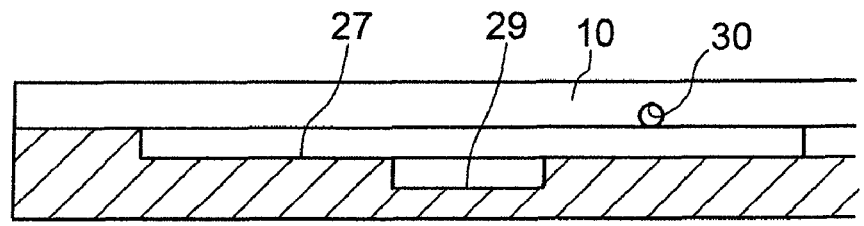
FIG. 11 is an enlarged view of the XI part of FIG. 8B.

As illustrated in FIG. 11, the mounting piece 4 has a holding groove 27 in which the fall prevention means 14 is held. In the holding groove 27, a coil spring holding groove 29 is further formed to hold the coil spring 28 as biasing member (see FIG. 14). In the enlarged part 10 of the mounting piece 4, a shaft insertion hole 30 is opened. Inserted into the shaft insertion hole 30 is a shaft 26 extending horizontally.

Figure 12:
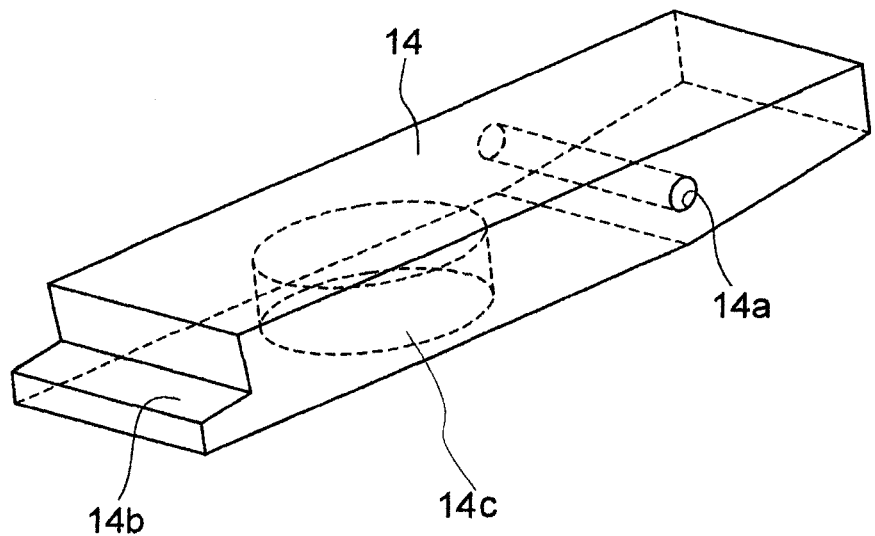
FIG. 12 is a perspective view of an engagement member.

FIG. 12 is a perspective view of an engagement member 14 as fall prevention means. The engagement member has a rectangular shape and a through hole 14a formed therein to make the shaft 26 pass through. The engagement member 14 oscillates around the shaft 26. At an end of the engagement member 14, a step-like projection 14b is formed. By oscillation of the engagement member 14 oscillates around the shaft 26, the projection 14b comes into engagement or out of engagement with the opening 15 of the raceway rail main body 6. In the lower surface of the engagement member 14, a coil spring holding groove 14c is formed to hold the coil spring 28.

Figure 13:
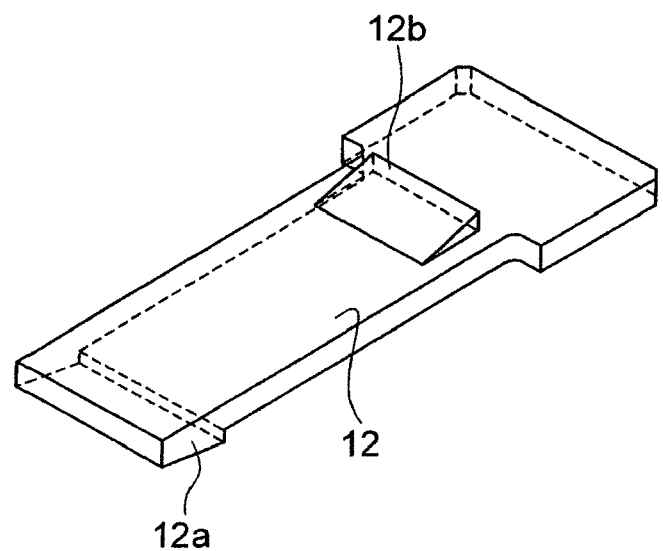
FIG. 13 is a perspective view of a tapered part.

FIG. 13 is a perspective view of the tapered part 12 as rattle preventing means. The tapered part 12 has a wedge part 12a that becomes thinner toward the tip end thereof. The upper surface of the tapered part 12 is formed to be flat. The wedge part 12a is formed in inclining the lower surface of the tapered part 12. In the upper surface of the tapered part 12, a ramp 12b is formed to engage the engagement opening 23 (see FIG. 4A) formed in the raceway rail main body 6. The ramp 12b is formed tapered to become thinner toward the tip end thereof.

Figure 14:
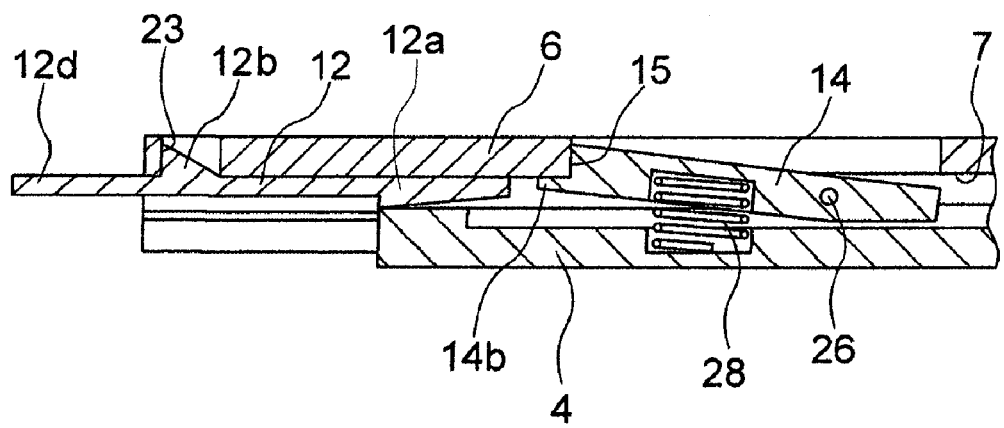
FIG. 14 is a cross-sectional view of the engagement member in engagement with an opening of the raceway rail main body.

FIG. 14 illustrates engagement of the engagement member 14 of the mounting piece 4 with the opening 15 of the raceway rail main body 6. Between the mounting piece 4 and the engagement member 14, the coil spring 28 is arranged to bias the engagement member 14 toward the raceway rail main body 6. In mounting of the raceway rail main body 6 on the mounting piece 4, the mounting piece 4 is first inserted into the mounting piece insertion groove 7 and, then, the engagement member 14 goes down against a spring force of the coil spring 28. When the engagement member 14 reaches the position of the opening of the raceway rail main body 6, the engagement member 14 oscillates upward around the shaft 26 by the spring force of the coil spring 28 and the projection 14b of the engagement member 14 comes into engagement with the opening 15. This prevents the mounting piece 4 from falling out of the raceway rail main body 6. Meanwhile, when the raceway rail main body 6 is detached from the mounting piece 4, fingers are used to push the engagement member 14 via the opening, the engagement member 14 comes out of engagement with the opening. With this operation, the raceway rail main body 6 can be taken out of the mounting piece 4. The engagement member 14 and the coil spring 28 enable one-touch attachment and detachment of the mounting piece 4 to and from the raceway rail main body 6.

Figure 15:
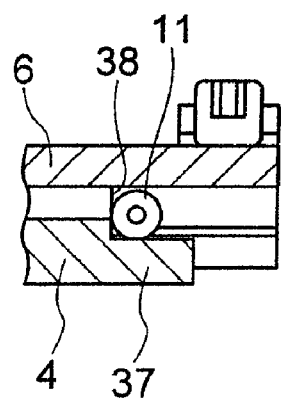
FIG. 15 is a cross-sectional view of the mounting piece abutting to an elastic stopper.

FIG. 15 illustrates the elastic stopper 11 mounted on the tip end of the mounting piece 4. As described above, once the engagement member 14 of the mounting piece 4 comes into engagement with the opening 15 of the raceway rail main body 6, the mounting piece 4 is prevented from falling out of the raceway rail main body 6. However, even in this state, the mounting piece 4 is still slidable toward the back of the raceway rail main body 6. In order to position the mounting piece 4 inside the raceway rail main body 6, the elastic stopper 11 is provided on the raceway rail main body 6. When the mounting piece 4 moves to the predetermined position, the abutting surface 38 of the mounting piece 4 abuts to the elastic stopper 11. With this abutting, the mounting piece is positioned in the longitudinal direction.

However, the gap between the raceway rail main body 6 an the mounting piece in the cross section perpendicular to the longitudinal direction cannot be removed only by making the abutting surface 38 of the mounting piece 4 to the elastic stopper 11. In order to remove the gap, the stopper abutting part 37 of the mounting piece 4 is slid under the elastic stopper 11. The elastic stopper compressed and deformed by the stopper abutting part 37 biases, by its reactive force, the tip end of the mounting piece downward toward the raceway rail main body 6. Then, the inclined surface 9 of the mounting piece 4 (see FIG. 3) comes into close contact with the inclined surface 8 of the raceway rail main body 6 and the gap between them can be removed. The inclined surface of the mounting piece 4 and the inclined surface of the raceway rail main body 6 are both formed symmetric with respect to the respective center lines. They are positioned in the horizontally by pressing the mounting piece 4 toward the raceway rail main body 6.

If the gap at the tip end side of the mounting piece 4 is removed, there is still a gap at the base end side of the mounting piece 4. As illustrated in FIG. 14, in order to remove the gap at the base end side of the mounting piece 4, the tapered part 12 is arranged to be fit between the end part of the raceway rail main body 6 an the end part of the mounting piece 4. The edge part of the tapered part 12 moves the mounting piece 4 downward. Then, the inclined surface 9 (see FIG. 3) of the mounting piece 4 comes into close contact with the inclined surface 8 of the raceway rail main body 6 (see FIG. 3), and the gap between them can be removed. When the tapered part 12 is inserted, the ramp 12b on the upper surface of the tapered part 12 engages the engagement opening 23 of the raceway rail main body 6. This engagement prevents the tapered part 12 from coming out of the raceway rail main body 6. In removing the tapered part 12, the end part 12d of the tapered part 12 projecting like a cantilever is bent downward by fingers. Then, the end part 12d comes out of the engagement opening 23 and the tapered part 12 is removed.

Figure 16:
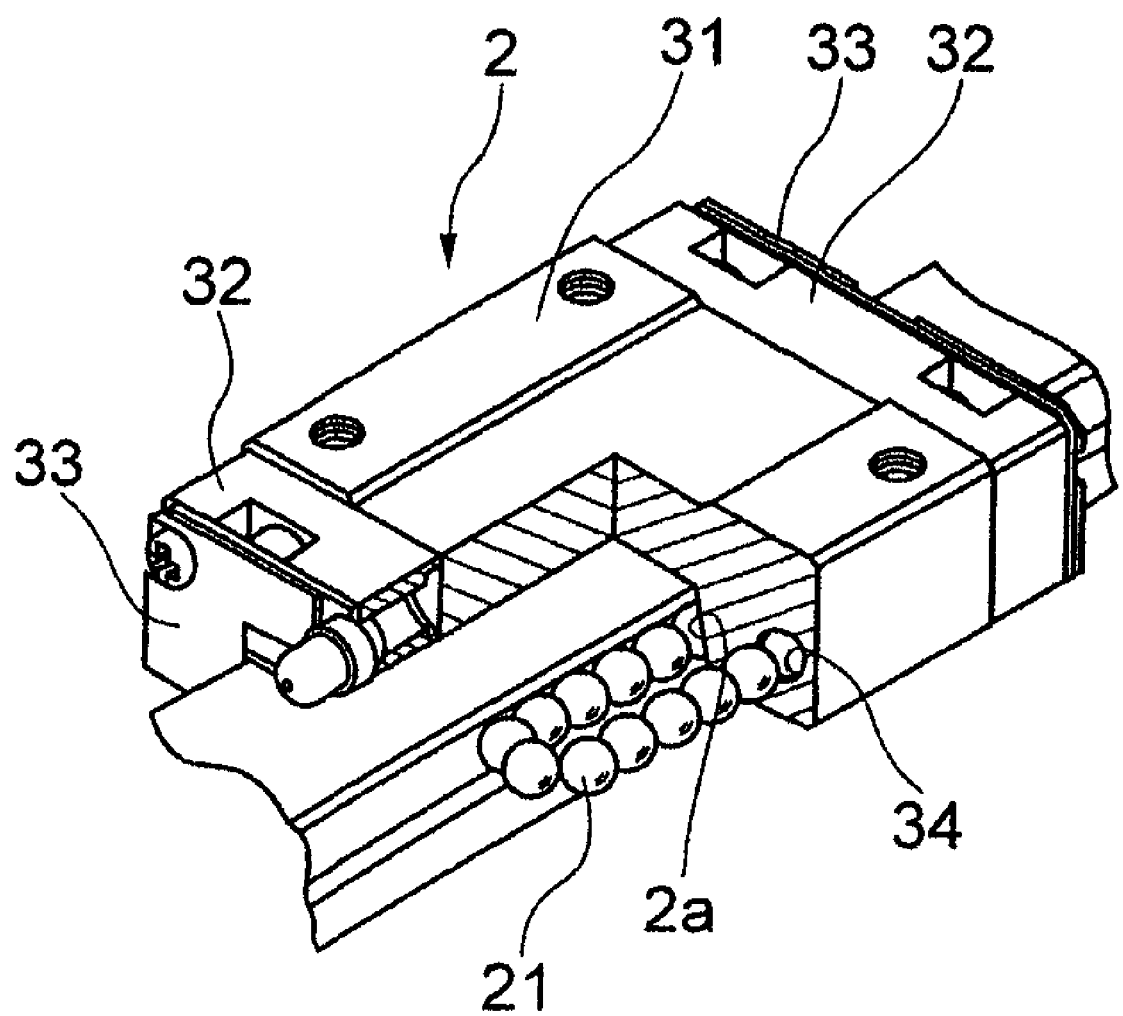
FIG. 16 is a perspective view of a moving block (including a partial cross-sectional view)

FIG. 16 is a perspective view of the moving block 2 (including a partial cross-sectional view). The moving block as a moving member is formed into a saddle shape as a whole and has a center part opposed to the upper surface of the raceway rail main body 6 and a pair of leg parts extending downward from the respective ends of the center part in the width direction, the leg parts facing the side surfaces of the raceway rail main body 6. The raceway rail main body 6 is sandwiched between the paired leg parts of the moving blocks 2. When the balls 21 are positioned between the raceway rail main body 6 and the moving block 2, the moving block 2 cannot be removed in the direction perpendicular to the longitudinal direction of the raceway rail main body 6.

The moving block 2 has a moving block main body 31 made of aluminum, and endplates 32 attached to respective ends of the moving block main body 31 in the moving direction. To each end plate 32, an end seal 33 is attached to prevent any foreign matter or moisture attached to an outer surface of the raceway rail from entering the moving block and prevent leakage of a lubricant inside the moving block 2 to the outside.

In each of the paired leg parts of the moving block main body 31, a loaded ball rolling groove 2a is formed facing the ball rolling groove 1a of the raceway rail main body 6, and a ball return path 34 is formed in parallel with the loaded ball rolling groove 2a. In each of the end plate 32, a U-shaped direction change path 35 (see FIG. 20) is formed connecting an end of the loaded ball rolling groove 2a and an end of the ball return path 34. These loaded ball rolling groove 2a, ball return path 34 and direction change path 35 form a circuit-like ball circulation path in which a plurality of balls 23 is arranged.

Figure 17:
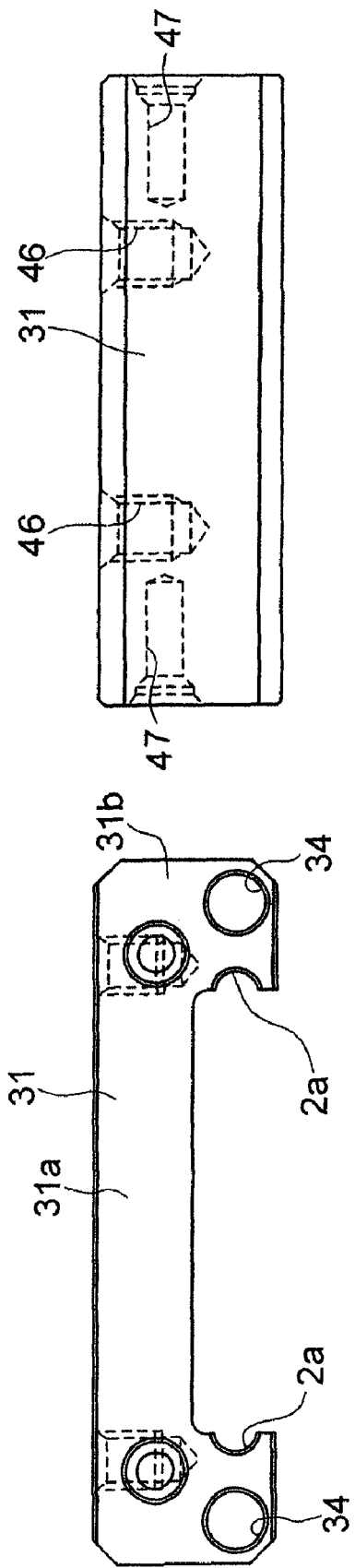
FIGS. 17A and 17B are detailed views of a moving block main body, FIG. 17A being a front view thereof and FIG. 17B being a side view thereof.

FIG. 17 is a detailed view of the moving block main body 31. The moving block main body 31 is manufactured by aluminum extrusion. The moving block main body 31 is formed into a saddle shape as a whole and has a center part 31a facing the upper surface of the raceway rail main body 6 and a pair of side wall parts 31b facing respective side surfaces of the raceway rail main body 6. In an inner side surface of each side wall part 31b, the loaded ball rolling groove 2a is formed facing the ball rolling groove 1a of the raceway rail main body 6. In each side wall part 31b, the ball return path 34 is formed as a though hole in parallel with the loaded ball rolling groove 2a. In the upper surface of the moving block main body 31, a mounting screw 46 is formed for mounting the moving block main body 31 onto a counterpart device. Each end surface of the moving block main body 31 in the moving direction, a mounting screw 47 is formed for attaching the end plate 32 to the moving block main body 31.

Figure 18:
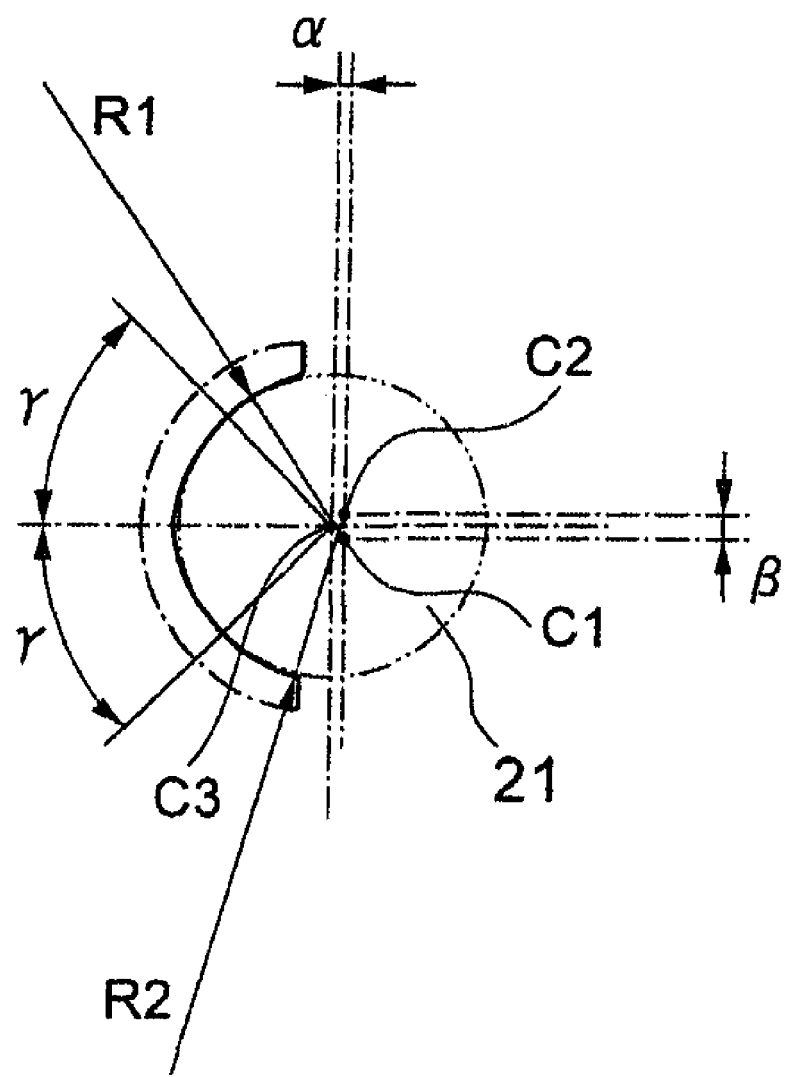
FIG. 18 is a detailed cross-sectional view of a loaded ball rolling groove of the moving block.

FIG. 18 is a detailed view of the loaded ball rolling groove 2a. The loaded ball rolling groove 2a has a Gothic arch shaped cross section consisting of combination of two arcs R1 and R2. The curvature radii of the two arcs R1 and R2 of the Gothic arch groove are slightly larger than the radius of the ball 21. The centers C1 and C2 of the two arcs R1 and R2, respectively, are shifted outside from the center C3 of the ball 21 by a distance α (right side in FIG. 18). And, a distance between the centers C1 and C2 of the two arcs R1 and R2 is shifted vertically by a distance β. A line connecting the center C3 of the ball 21 and a contact point between the ball 21 and the arc R1 or R2 forms a contact angle γ with respect to the horizontal like, and the contact angle γ is set to 45 degrees. As the loaded ball rolling groove 2a is of a Gothic arch groove, the ball 21 can bear both of vertical and horizontal loads.

The ball 21 is made of synthetic resin such as polyacetal (POM). When the raceway rail main body 6 and the moving block main body 31 are manufactured by aluminum extrusion, these dimensions sometimes lack precision. As the ball 21 is made of resin, the ball 21 is easily elastically deformed and absorbs poor precision in dimensions of the raceway rail main body 6 and the moving block. In addition, as the ball is made of resin, weight reduction can be achieved. Here, as stroke of the moving block 2 is restricted by the stopper 3 and the moving block 2 is prevented from coming out of the raceway rail main body 6 in the longitudinal direction. For this reason, the moving block 2 does not has any function of preventing balls 21 from coming out of the moving block 2 when the moving block 2 is out of the raceway rail main body 6.

Figure 19:
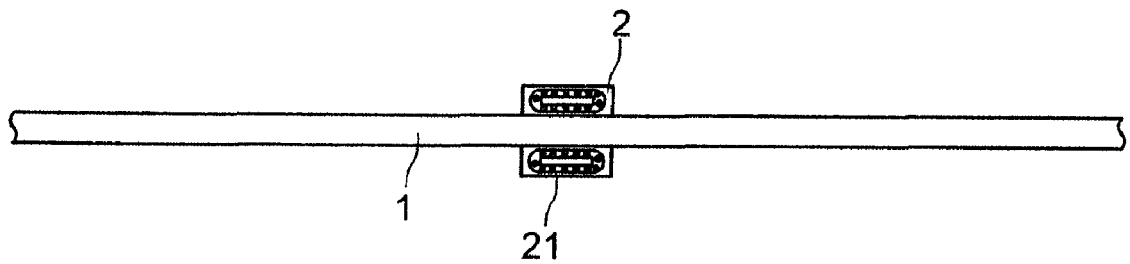
FIG. 19 is a cross-sectional view of the moving block mounted on the raceway rail.
Figure 20:
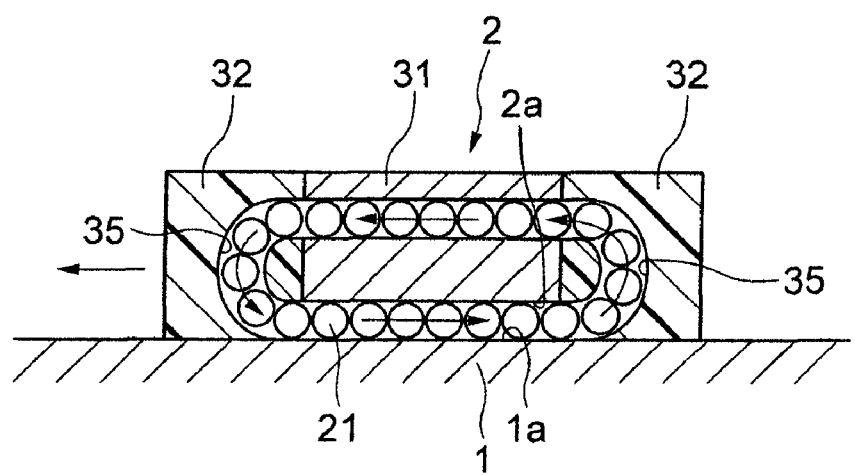
FIG. 20 is an enlarged view of a circulation structure of the moving block.

FIGS. 19 and 20 illustrate the moving block 2 mounted on the raceway rail 1. When the moving block 2 is moved linearly relative to the raceway rail 1, a ball 21 rolls between the ball rolling groove 1a of the raceway rail 1 and the loaded ball rolling groove 2a f the moving block 2. In accordance with rolling of the ball 21, all the balls arranged in the ball circulation path circulate in unison.

According to the motion guide device of this exemplary embodiment, as the circulation structure of the balls 21 and the basic structure of the moving block 2 are the same as those of the conventional linear guide, the moving block 2 can be moved linearly smoothly without rattle. Further, as the moving block 2 can be traveled the almost entire length of the raceway rail 1, the stroke of the moving block can be made longer. Meanwhile, in the case of using a finite stroke type motion guide device in which balls do not circulate, multistage guide parts need to be provided to elongate the stroke. The multistage guide parts cause accumulation of rattle, which prevents smooth guide.

Figure 21:
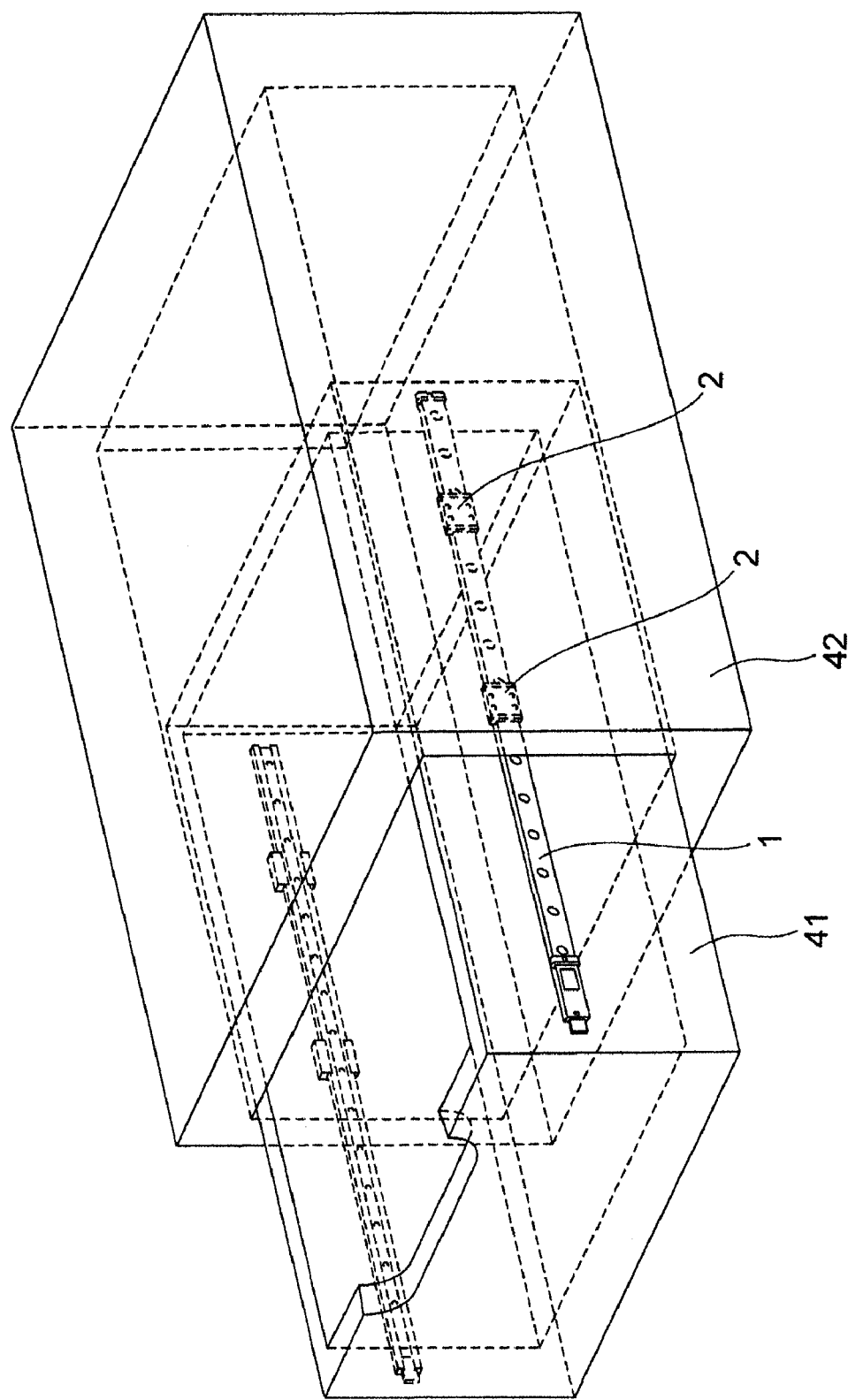
FIG. 21 is a perspective view illustrating an example of the motion guide device applied to a drawer.

FIG. 21 illustrates an example of the motion guide device of the present invention applied to a drawer. The motion guide device is mounted on between a drawer 41 as a first member and a case 42 as a second member. In this example, the raceway rail 1 is mounted on each side surface of the drawer. The moving block 2 is mounted on each inner side surface of the case 42. When the motion guide devices of the present invention are used, the drawer can be drawn smoothly without rattle, thereby giving the drawer an upscale image. Therefore, the drawer can be suitably used in, for example, aircrafts, automobiles, systematically equipped kitchens, high-grade furniture and the like. Further, each component of the motion guide device can be made of aluminum or resin, thereby enabling weight reduction.

FIG. 22 illustrates an example of the method for mounting the motion guide device onto the drawer. First, the mounting piece 4 is attached to a side surface of the drawer 41. Then, the raceway rail main body 6 is assembled on the moving block 2, and the moving block 2 is mounted on the inner side surface of the case 42. Next, the mounting piece 4 is inserted into the mounting piece insertion groove 7 of the raceway rail main body 6, and the mounting piece 4 is mounted on the raceway rail main body 6. Finally, the tapered part 12 is fit between the raceway rail main body 6 and the mounting piece 4. When the motion guide device is removed, the operations are performed in reverse order.

As the raceway rail main body 6 is detachable from the mounting piece 4, the raceway rail main body 6 can be detached from the mounting piece 4 while the mounting piece 4 is still mounted on the drawer 41 and the moving block 2 is still mounted on the case 42. In other words, as the drawer 41 can be separated from the case 42, maintenance of the drawer 41 such as cleaning can be facilitated. Further, as the moving block 2 does not need to take out of the raceway rail main body 6, there is no need to provide a holder for preventing falling of the balls 21.

Figure 23:
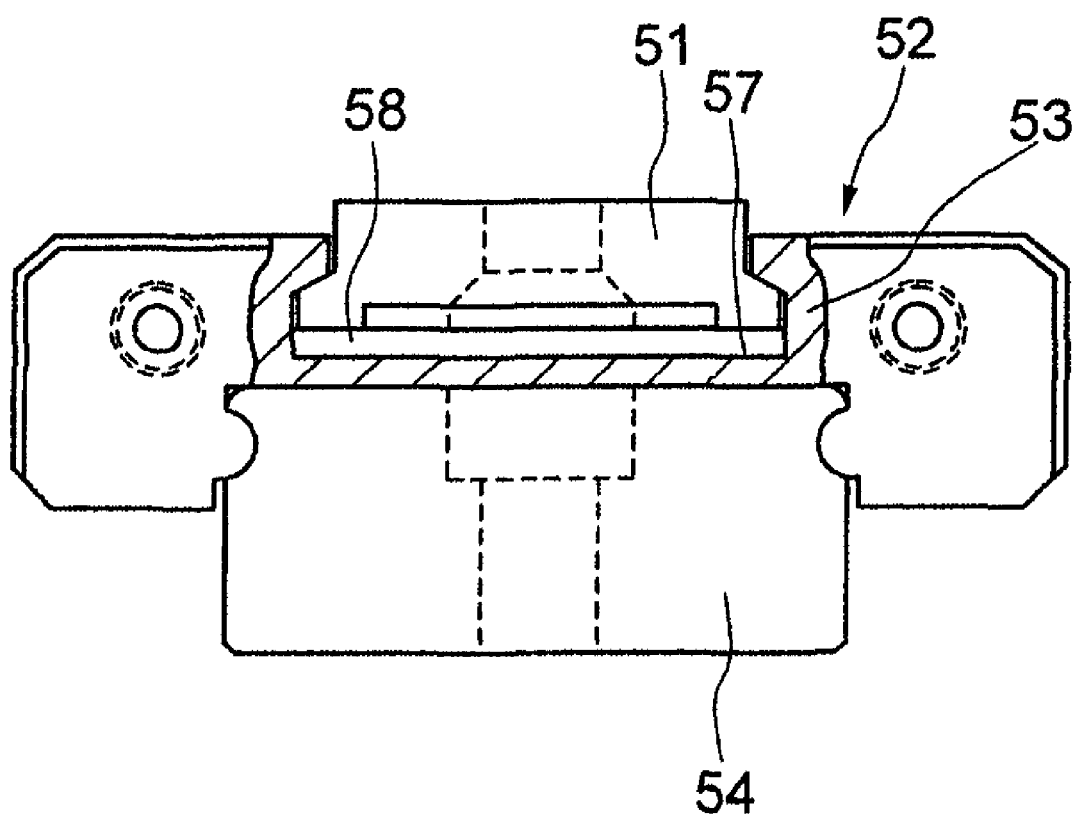
FIG. 23 is a front view of a motion guide device according to a second embodiment of the present invention.

FIG. 23 illustrates a motion guide device according to the second exemplary embodiment of the present invention. In the motion guide device in this exemplary embodiment, a mounting piece 51 is mounted on a moving block 52. More specifically, the moving block 52 has a mounting piece 52 attached to a counterpart device and a moving block main body 53 as a moving member main body being attached to the mounting piece 51 detachably and having a ball circulation path. In the moving block 52, a mounting piece insertion groove 57 is formed extending in the moving direction. The mounting piece 51 is inserted into the mounting piece insertion groove 57 in such a manner that the mounting piece 51 is slidable in the moving direction of the moving block 52 and prevented from being taken out thereof vertically. In order to prevent rattle from occurring between the moving block main body 53 and the mounting piece 51, a tapered part (rattle prevention means) 58 is fit therein. As the moving block main body 53 assembled on the raceway rail 54 can be detached from the mounting piece 51 while the mounting piece 51 is mounted on the counterpart device, the moving body can be easily detached from the main body.

The present invention is not limited to the above-described exemplary embodiments and may be embodied in various formed without departing from the scope of the present invention. For example, not balls but rollers may be used as rolling elements. The number of threads and the cross-sectional shape may be modified in accordance with a load that the motion guide device bears. In view of weight reduction, the raceway rail and the moving block are preferably made of aluminum and the rolling elements are preferably made of synthetic resin. However, if the strength needs to be increased, they may be steel products.

In the above-described exemplary embodiments, the raceway rail is mounted on the drawer as the moving body and the moving block is mounted on the case as fixed body, however the raceway rail may be mounted on fixed body and the moving block may be mounted on the moving body. The mounting position of the motion guide device onto the drawer is not limited to the side surface of the drawer but may be a bottom surface of the drawer. Further, the present invention may be applied not only the drawer but also various guide parts that need separation.

The present invention is not limited to the above described embodiments, and various variations and modifications may be possible without departing from the scope of the present invention.

This application is based on the Japanese Patent application No. 2008-255351 filed on Sep. 30, 2008, entire content of which is expressly incorporated by reference herein.

What is claimed is:

1. A motion guide device comprising:
a raceway rail having a rolling-element rolling part;
a moving block having a rolling-element circulation path including a loaded rolling-element rolling part facing the rolling-element rolling part of the raceway rail and being mounted on the raceway rail movable relative to the raceway rail;
a plurality of rolling elements arranged in the rolling-element circulation path of the moving block; and
the raceway rail having a mounting member which does not have the rolling-element rolling part and is configured to be mounted onto a counterpart device, and a raceway rail main body which has the rolling-element rolling part and is configured to be mounted on the mounting member detachably,
wherein the raceway rail main body includes,
a mounting member insertion groove configured to make the mounting member slide in a longitudinal direction of the raceway rail main body and to prevent the mounting member from coming out of the raceway rail main body in a direction perpendicular to the longitudinal direction, and
a rattle preventing means, between the raceway rail main body and the mounting member, for preventing a gap from occurring between the raceway rail main body and the mounting member in a cross-sectional direction, perpendicular to the longitudinal direction.

2. The motion guide device of claim 1, wherein the rattle preventing means comprises a tapered part having a wedge part that becomes thinner toward a tip end thereof, the wedge part is fit in between the raceway rail main body and the mounting member so as to remove the gap, and the mounting member comes into contact with the raceway rail main body by sliding the tapered part in the longitudinal direction of the raceway rail main body.

3. The motion guide device of claim 1 or 2, wherein the rattle preventing means has an elastic member, provided on the raceway rail main body, for restricting the mounting member not to slide a predetermined distance or more in the longitudinal direction, relative to the raceway rail main body and bringing the mounting member into dos contact with the raceway rail main body so as to remove the gap.

4. The motion guide device of claim 1 or 2, wherein an entire length of the raceway rail main body in a longitudinal direction is substantially equal to an entire length of the mounting member in the longitudinal direction.

5. The motion guide device of claim 1 or 2, wherein
the raceway rail main body has an opening configured to expose the mounting member inserted in the mounting member insertion groove,
the mounting member has an engagement member configured to come into or out of engagement with the opening by oscillating around a shaft, and a biasing member configured to bias the engagement member toward the raceway rail main body,
in mounting the mounting member on the raceway rail main body, once the engagement member of the mounting member inserted in the raceway rail main body reaches a position of the opening, the engagement member comes into engagement with the opening by a biasing force of the biasing member, and
in detaching the mounting member from the raceway rail main body, the engagement member is pressed via the opening to bring the engagement member out of engagement with the opening and the mounting member is taken out of the raceway rail main body in the longitudinal direction.

6. A motion guide device comprising:
a raceway rail having a rolling-element rolling part;
a moving block having a rolling-element circulation path including a loaded rolling-element rolling part facing the rolling-element rolling part of the raceway rail and being mounted on the raceway rail movable relative to the raceway rail;
a plurality of rolling elements arranged in the rolling-element circulation path of the moving block; and
the moving block having a mounting member which does not have the loaded rolling-element rolling part and is configured to be mounted onto a counterpart device, and a raceway rail main body which has the loaded rolling-element rolling part and is configured to be mounted on the mounting member detachably,
wherein the moving block main body includes,
a mounting member insertion groove configured to make the mounting member slide in a longitudinal direction of the moving block main body and to prevent the mounting member from coming out of the moving block main body in a direction perpendicular to the longitudinal direction, and
a rattle preventing means, between the moving block main body and the mounting member, for preventing a gap from occurring between the moving block main body and the mounting member in a cross-sectional direction perpendicular to the longitudinal direction.

* * * * *